US007657939B2

(12) United States Patent
Strauss et al.

(10) Patent No.: US 7,657,939 B2
(45) Date of Patent: Feb. 2, 2010

(54) COMPUTER SECURITY INTRUSION DETECTION SYSTEM FOR REMOTE, ON-DEMAND USERS

(75) Inventors: Christopher J. Strauss, Trabuco Canyon, CA (US); Sebnem Jaji, Flower Mound, TX (US); Ramesh V. Chitor, Fremont, CA (US); Nam Keung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 11/079,380

(22) Filed: Mar. 14, 2005

(65) Prior Publication Data

US 2006/0206940 A1    Sep. 14, 2006

(51) Int. Cl.
*G06F 21/00* (2006.01)
(52) U.S. Cl. ...................................... 726/23
(58) Field of Classification Search ............ 726/23
See application file for complete search history.

(56) References Cited

U.S. PATENT DOCUMENTS

| 6,986,161 | B2* | 1/2006 | Billhartz | 726/23 |
| 2002/0069369 | A1* | 6/2002 | Tremain | 713/201 |
| 2002/0112185 | A1* | 8/2002 | Hodges | 713/201 |

(Continued)

FOREIGN PATENT DOCUMENTS

WO    WO 0137511    5/2001

OTHER PUBLICATIONS

Li Xiangyang, "Grid- and Dummy-Cluster-Based Learning of Normal and Intrusive Clusters for Computer Intrusion Detection," Quality and Reliability Engineering International vol. 18, No. 3, May-Jun. 2002, abstract of pp. 231-242.

(Continued)

*Primary Examiner*—Nasser G Moazzami
*Assistant Examiner*—Michael S McNally
(74) *Attorney, Agent, or Firm*—Walter W. Duft; Steven L. Bennett

(57) ABSTRACT

An intrusion detection system, and a related method and computer program product, for implementing intrusion detection in a remote, on-demand computing service environment in which one or more data processing hosts are made available to a remote on-demand user that does not have physical custody and control over the host(s). Intrusion detection entails monitoring resources defined by the on-demand user (or a third party security provider) for intrusion events that are also defined by the on-demand user (or security provider), and implementing responses according to event-action rules that are further defined by the on-demand user (or security provider). An intrusion detection system agent is associated with each of the data processing hosts, and is adapted to monitor the intrusion events and report intrusion activity. If there are plural intrusion detection system agents, they can be individually programmed to monitor and report on agent-specific sets of the intrusion events. An intrusion detection system controller is associated with one of the data processing hosts. It is adapted to manage and monitor the intrusion detection system agent(s), process agent reports of intrusion activity, and communicate intrusion-related information to the on-demand user (or security provider). The responses to intrusion events can be implemented by the intrusion detection system controller in combination with the intrusion detection system agents, or by any such entity alone.

4 Claims, 7 Drawing Sheets

U.S. PATENT DOCUMENTS

| | | | | |
|---|---|---|---|---|
| 2002/0162026 | A1* | 10/2002 | Neuman et al. | 713/201 |
| 2003/0172145 | A1* | 9/2003 | Nguyen | 709/223 |
| 2003/0188189 | A1* | 10/2003 | Desai et al. | 713/201 |
| 2003/0220940 | A1 | 11/2003 | Futoransky et al. | 707/104.1 |
| 2003/0229559 | A1* | 12/2003 | Panttaja et al. | 705/36 |
| 2004/0073800 | A1 | 4/2004 | Shah et al. | 713/176 |
| 2004/0123141 | A1* | 6/2004 | Yadav | 713/201 |
| 2004/0143749 | A1* | 7/2004 | Tajalli et al. | 713/200 |

OTHER PUBLICATIONS

P. Oman et al., "Safeguarding IEDs, Substations, and SCADA Systems Against Electronic Intrusions," 2001 Western Power Delivery Automation Conference, Apr. 2001, abstract of pp. 19 et seq.

Proceedings International Conference on Dependable Systems and Networks, IEEE Comput. Soc., Jun. 2002, abstract of pp. xxvii+799.

Peng Ning et al., "Abstraction-Based Intrusion Detection In Distributed Environments," ACM Transactions on Information and System Security, vol. 4, No. 3, Nov. 2001, pp. 407-452.

Geetha Ramachandran et al., "A P2P Intrusion Detection System Based on Mobile Agents," ACME, Apr. 2004, pp. 185-190.

Deborah Frincke, "Balancing Cooperation and Risk in Intrusion Detection," ACM Transactions on Information and Systems Security vol. 3, No. 1, Feb. 2000, pp. 1-20.

Leonard J. LaPadula, "State of the Art in CyberSecurity Monitoring," MITRE Center for Integrated Intelligence Systems, 2001, pp. i, iii, 1-15.

* cited by examiner

COMPUTER SECURITY INTRUSION DETECTION SYSTEM FOR REMOTE, ON-DEMAND USERS

BACKGROUND OF THE INVENTION

1. Field of the Invention

The present invention relates to intrusion detection systems. More particularly, the invention concerns an intrusion detection system that operates in a remote, on-demand computing service environment.

2. Description of the Prior Art

By way of background, many institutional entities purchase or lease computing resources and deploy them physically within their facilities. Users of these data processing systems will typically connect thereto over an institutional network or, to a limited degree, the institution may allow trusted individuals some type of VPN (Virtual Private Network) remote access over a public network, such as the Internet. In either case, the type of access to the data processing system (and by whom) is known.

Remote, on-demand computing is a more recent innovation in the data processing field. According to this model, a customer obtains computing services from a remote computer system that is not under the customer's physical custody and control. Instead, the remote system is typically owned by another entity that maintains the system at its own premises. In some cases, the system owner's equipment used to provide remote, on-demand service may be spread over plural geographic locations, as where the remote on-demand system comprises a computer grid network with plural interlinked data processing hosts. A disadvantage of remote, on-demand computing is that it is difficult for the remote user to know whether or not their applications and data are being accessed by others who may also have access to the same computer equipment, such as a system administrator associated with the on-demand service provider. On-demand users are generally provided with firewall protection implemented on the data processing hosts assigned to provide the on-demand services. However, firewalls only block network-originating intrusions, and only based on a fixed set of specific rules. Events such as a login by an on-premises administrator via a local console are typically not blocked, or even reported.

An intrusion detection system can detect unusual events and provide a record of suspected activity, regardless of its point of origin. However, as far as known, intrusion detection has not been offered to remote on-demand users so that they can monitor intrusion activity on the remote data processing hosts to which they are assigned. This may cause customers to be reluctant to take advantage of remote, on-demand services. For example, consider a hardware vendor who wishes to encourage a proprietary software vendor to test the software vendor's software on the hardware vendor's computing platform. Given the option of either running the software under a remote, on-demand service model or simply borrowing or renting the hardware and setting it up at their own facility, a security conscious software vendor may well insist on the latter arrangement. This is undesirable from the hardware vendor's perspective due to the high capital costs of equipment loaner and leasing programs.

Accordingly, an intrusion detection system is needed that can provide remote on-demand computing service users with the security assurances they require before utilizing such services. What would be particularly desirable is an intrusion detection system for use in a remote, on-demand computing service environment wherein users are provided with a view of the remote data processing resources as though such resources where physically "in house," and wherein the users are fully informed whenever security has been violated. Preferably, remote, on-demand service users should have the ability to fully define each type of security event they desire to have monitored and to specify how such events are to be handled.

SUMMARY OF THE INVENTION

The foregoing problems are solved and an advance in the art is obtained by an intrusion detection system, and a related method and computer program product, for implementing intrusion detection in a remote, on-demand computing service environment in which one or more data processing hosts are made available to a remote on-demand user that does not have physical custody and control over the host(s). Intrusion detection performed by the intrusion detection system entails monitoring one or more resources defined by the on-demand user for intrusion events that are also defined by the on-demand user, and implementing responses according to event-action rules that are further defined by the on-demand user. Alternatively, the resources, events and responses can be defined by a third party entity, such as a security provider, authorized to act on behalf of the on-demand user.

According to exemplary implementations of the invention, the intrusion detection system includes an intrusion detection system (IDS) agent associated with each data processing host. The IDS agent(s) is/are adapted to monitor the user-defined events and report intrusion activity. If there are plural IDS agents, they can be individually programmed to monitor agent-specific sets of user-defined intrusion events. The intrusion detection system further includes an intrusion detection system (IDS) controller associated with one of the data processing hosts. The IDS controller is adapted to manage and monitor the IDS agent(s), process agent reports of intrusion activity, and communicate intrusion-related information to the on-demand user or other authorized entity. User-defined responses to intrusion events can be implemented by the IDS controller in combination with the IDS agent(s), or by any such entity alone.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1:
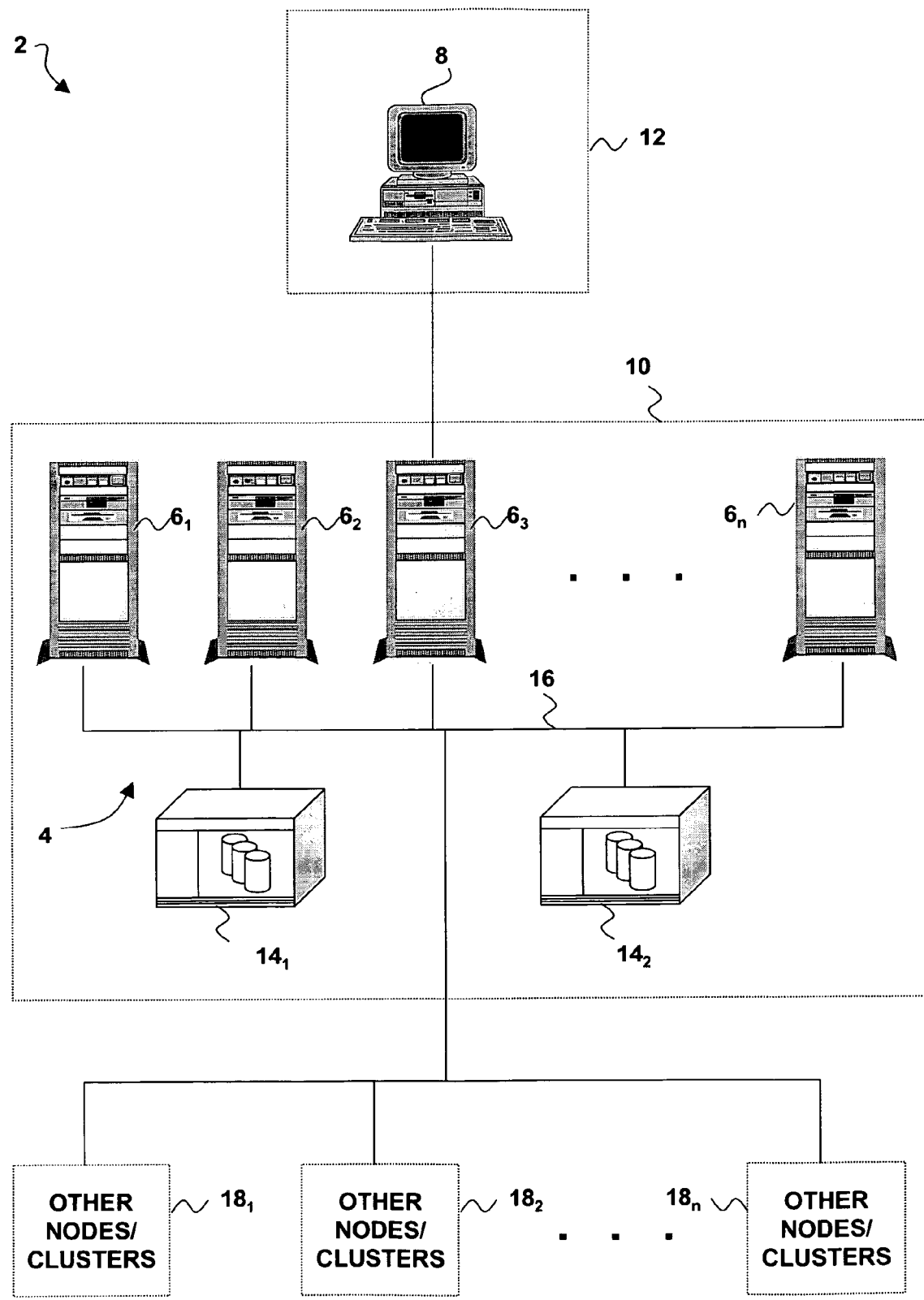
FIG. 1 is a functional block diagram showing a remote, on-demand computing service environment that includes a computer system hosting an intrusion detection system in accordance with the present invention.

Turning now to the drawing figures, wherein like reference numerals indicate like elements in all of the several views, FIG. 1 illustrates a computer service environment 2 that is adapted to provide remote on-demand service, and which may be used to host an intrusion detection system according to the present invention. For ease of description, the computer service environment 2 will be hereinafter referred to as an "on-demand environment." In the on-demand environment 2, a computer system 4 is configured with one or more data processing hosts $6_1, 6_2, 6_3 \ldots 6_n$, each of which comprises a conventional combination of data processing hardware, an operating system, and a layer of application software. The data processing hosts $6_1, 6_2, 6_3 \ldots 6_n$ interact with an on-demand user system 8 that is remote from the system 4. The system 4 is assumed to be located at a first premises 10 and the on-demand user system 8 is assumed to be located at a second premises 12. It is further assumed that the on-demand user system 8 is operated by or on behalf of an on-demand user entity (hereinafter "on-demand user") that does not have physical custody and control over the system 4. By way of example, the system 4 could be owned and operated by an on-demand service provider and the on-demand user system 8 could be owned and operated by an on-demand user that contracts with the on-demand service provider for use of the system 4 to run the on-demand user's data processing applications. A typical on-demand computing contract might result in the on-demand service provider configuring system 4 to operate as a grid or cluster of computers (representing some or all of the data processing hosts $6_1, 6_2, 6_3 \ldots 6_n$) that is made available to the on-demand user. The latter would utilize the processing power of the grid or cluster to run software that is uploaded to the system 4 via the on-demand user system 8 (or otherwise installed on the system 4).

Additional equipment, such as data storage systems $14_1$ and $14_2$, may be provided as part of the system 4 to support the data processing operations required by the on-demand user system 8. All of these entities may be interconnected by way of a network 16 or other communication interface operating according to a conventional protocol, such as TCP/IP. It should be further understood that the data processing hosts of the system 4 need not all be situated at the premises 10. As shown in FIG. 1, the system 4 could include any number of additional data processing nodes or node clusters $18_1$, $18_2 \ldots 18_n$ located at any number of separate premises. The nodes/clusters $18_1, 18_2 \ldots 18_n$ could be statically assigned for use by the on-demand user or they could be dynamically allocated as the on-demand user's data processing requirements fluctuate.

Figure 2:
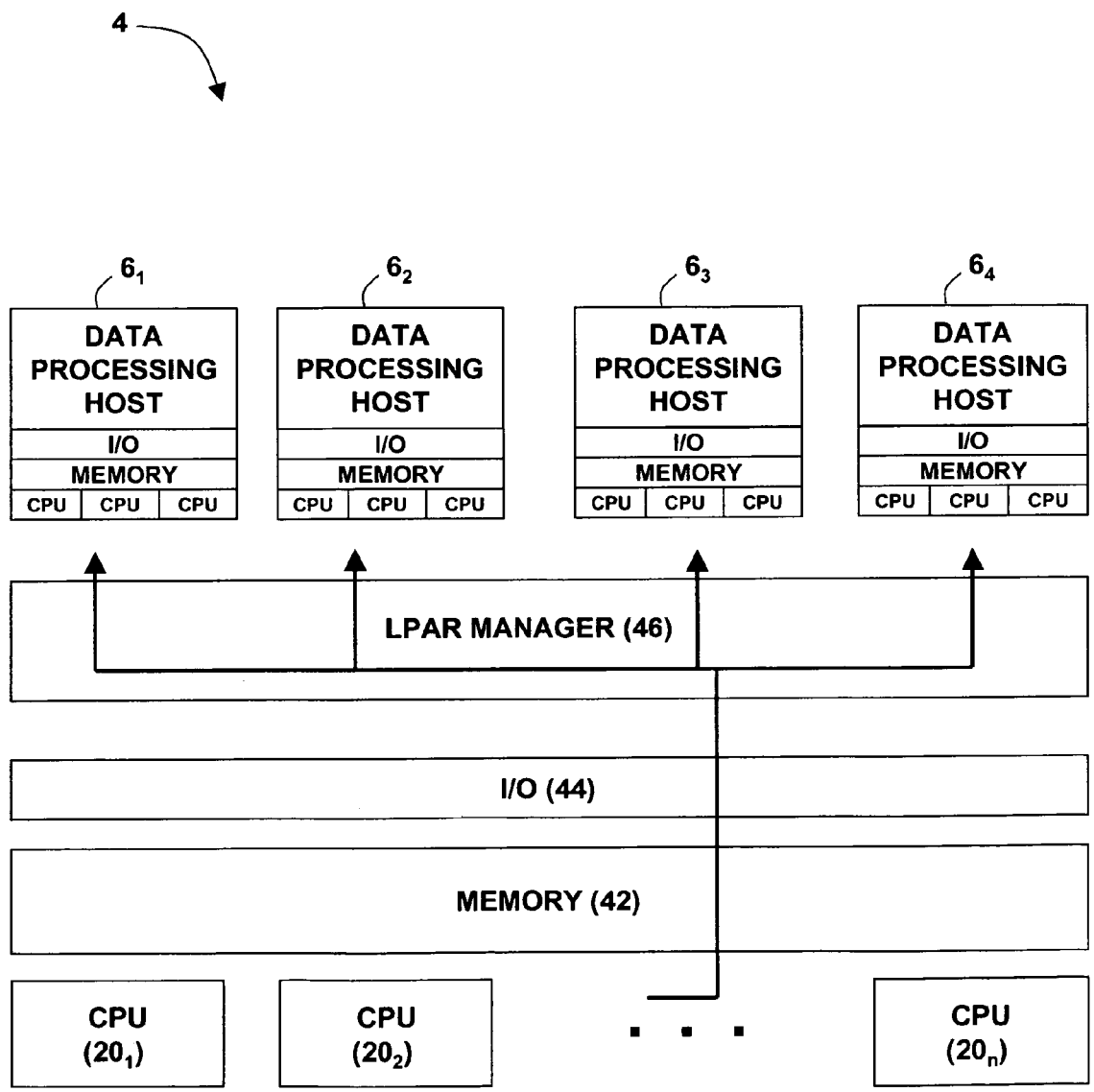
FIG. 2 is a functional block diagram showing an alternative implementation of the system of FIG. 1.

Although FIG. 1 depicts the data processing hosts $6_1, 6_2, 6_3 \ldots 6_n$ of the system 4 as being discrete computing platforms, this need not necessarily be the case. For example, as shown in FIG. 2, the system 4 could be implemented on a single logically partitionable data processing system. One example of such a system would be the IBM® eServer™ pSeries® server from International Business Machines Corporation, running version 5.2 of the IBM® AIX® 5L operating system or the like. In such an environment, the system 4 would be implemented with a collection of shared data processing hardware resources that include one or more central processing units (CPUs) $20_1, 20_2 \ldots 20_n$, a memory 42, and a set of input/output (I/O) facilities 44. A logical partition (LPAR) manager 46 would define the data processing hosts $6_1, 6_2, 6_3 \ldots 6_n$ of the system 4 by virtualizing the aforementioned hardware resources to provide a subset of the CPU, memory and I/O resources (i.e., a virtual machine) on behalf of higher level guest operating systems and their applications. The dynamic logical partitioning capability provided by such a system would allow processor, memory and I/O slot resources to be added to or deleted from running partitions, or moved between running partitions, without having to reboot partition operating systems. This would make the implementation of FIG. 2 ideal for dynamically allocating computational resources on behalf of the on-demand user according to workflow fluctuations.

Figure 3:
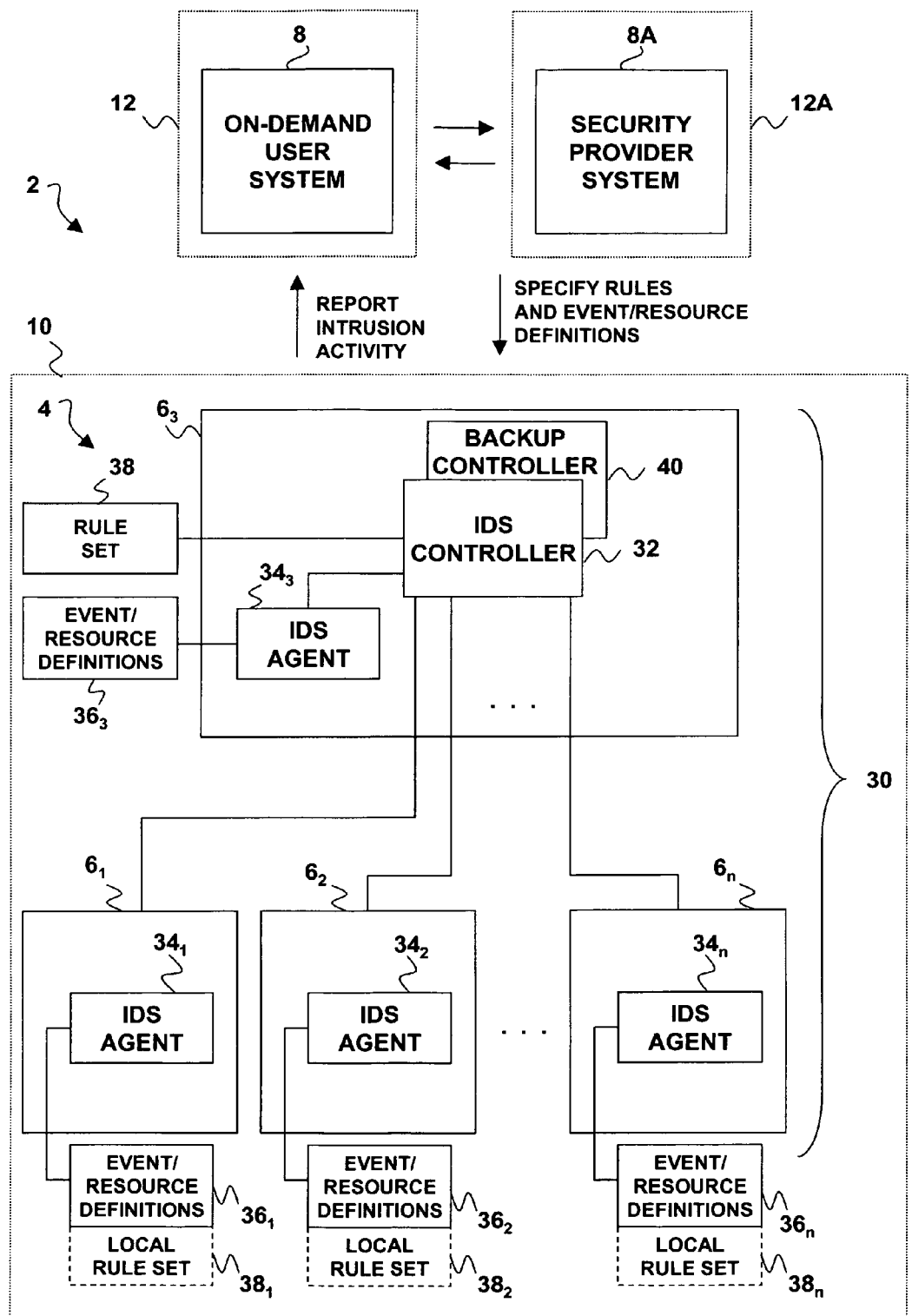
FIG. 3 is a detailed functional block diagram showing features of an intrusion detection system according to the invention running in an installation of the system of FIG. 1 in which there are plural data processing hosts.

Turning now to FIG. 3, an alternative view of the on-demand environment 2 is shown in order to illustrate the operation of an intrusion detection system 30 therein according to the principles of the present invention. FIG. 3 illustrates the computer system 4 and its data processing hosts $6_1, 6_2, 6_3 \ldots 6_n$, together with the on-demand user system 8. The intrusion detection system 30 is represented by the various labeled software entities residing within each data processing host $6_1, 6_2, 6_3 \ldots 6_n$, the functions of which will be presently discussed.

The intrusion detection system 30 is adapted to allow an on-demand user to monitor activity on data processing hosts $6_1, 6_2, 6_3 \ldots 6_n$ of the system 4, regardless of its point of origin. Moreover, the on-demand user can act as if it were the owner of the data processing hosts $6_1, 6_2, 6_3 \ldots 6_n$ and the system 4 was physically located at the on-demand user premises 12. These advantages are obtained by allowing the on-demand user to customize and control all major aspects of intrusion detection system operation even though the on-demand user does not have physical custody and control over the data processing hosts $6_1, 6_2, 6_3 \ldots 6_n$. In particular, even though another entity may own and operate the data processing hosts $6_1, 6_2, 6_3 \ldots 6_n$, the intrusion detection system 30 allows the on-demand user to monitor resources thereon that are defined by the on-demand user for intrusion events that are likewise defined by the on-demand user, and to implement responses according to event-action rules that are further defined by the on-demand user.

The resources that the intrusion detection system 30 can be programmed by the on-demand user to monitor for signs that the system 4 may be compromised are many and varied. By way of example only, detection capabilities that may be selectively specified by the on-demand user could include:

1) examining one or more system log files;
2) looking for user files with elevated permissions;
3) checking system binaries;
4) examining files run by time scheduling processes;
5) checking for unauthorized network services;
6) examining password files
7) searching for hidden files or unusual files designated as suspect by the on-demand user;
8) checking for packet sniffing;
9) checking for port scanning;
10) checking system and network configuration; and
11) examining remote access settings.

By examining these and other resources, the intrusion detection system 30 can be customized by the on-demand user to track any relevant intrusion event occurring in the system 4, including hardware events, operating system events, system access events and network access events. Activity that does not correspond to a tracked intrusion event for a monitored resource will be allowed to proceed. Activity that corresponds to a tracked event for a resource being monitored will be handled by way of responses or response sequences according to the event-action rules defined by the on-demand user. Such event-action rules can be written using any suitable policy definition language (such as a conventional "if-then-else" policy language of the type used for policy-based network management).

The actions taken in response to intrusion events will typically include logging the events and reporting them to the on-demand user via the on-demand user system 8. Depending on the requirements of the on-demand user, the reporting of response actions could be triggered by a single intrusion event as well as complex event sequences, such as repeated access attempts from a single potentially hostile source. In all cases, the intrusion detection system 30 will maintain a record of unusual activity in the system 4 (as defined by the on-demand user) so that the on-demand user can review any accesses that took place and validate them. In addition to the reporting of intrusion events, the actions taken in response to intrusion events may include remedial actions or action sequences, such as blocking incoming packets at a network port, denying access to a file, etc. To provide additional flexibility, the intrusion detection system 30 may be programmed to allow event context information to be specified as part of event-action rules, such as the time when an event occurs. With this capability, the on-demand user could specify complex rules, such as rules for taking different actions in response to events at different times of day.

As an example of the manner in which the intrusion detection system 30 can handle intrusion events based on event-action rules specified by the on-demand user, consider a scenario where an unauthorized root user, possibly an administrator associated with the on-demand service provider that owns the system 4, logs in and attempts to alter the permissions of a non-root user file. Assuming the intrusion detection system 30 is programmed by the on-demand user to track login and user file permission alteration events, an event-action rule could be triggered that causes a report to be sent to the on-demand user that the login has occurred, and that the user file has had its permissions changed. The on-demand user could then take action on its own to rectify the situation, such as to place a telephone call the on-demand service provider. Alternatively, the on-demand user could specify an event-action rule that causes a remedial action to be performed by the intrusion detection system 30. For example, the on-demand user could specify that a message be sent to the administrator advising that the file permission change is unauthorized and requesting that the person contact the on-demand user to provide an explanation.

A further illustration of the manner in which the intrusion detection system 30 can handle intrusion events would be a scenario where a firewall on one of the data processing hosts $6_1$, $6_2$, $6_3$ ... $6_n$ (with public network connectivity) reports unusual intrusion-related activity (e.g. a denial of service attack). In that case, an event-action rule specified by the on-demand user could provide for an intrusion detection system agent (described in more detail below) to call an API (Application Programming Interface) of a software application running on behalf of the on-demand user. Depending on the application, the API call could be used to modify the application's operational mode, protect its data, or even perform an application shutdown depending on the perceived threat level.

To help facilitate the on-demand user's specification of event-action rules, the intrusion detection system 30 can be configured with a default set of intrusion criteria based on the system's hardware, operating system, system configuration, system access and network configuration. Using a web-browser or other interface supported by the intrusion detection system 30, the on-demand user can then modify these criteria as desired. As described in more detail below, the intrusion detection system 30 will store the criteria defined by the on-demand user (which may be the default set of intrusion criteria if no changes are made) in appropriate configuration files. The intrusion detection system 30 will then generate and store the programs needed to detect intrusion events and the programs needed to implement user-defined actions when necessary. Recovery sequences for recovering the intrusion detection system 30 from an error condition can also be configured by the on-demand user, and a default set of criteria may again be provided by the on-demand service provider to assist the on-demand user in this regard.

Note that for purposes of the present invention, a default set of security-related criteria is considered to be on-demand user-defined so long as the on-demand user is given the opportunity to either approve or disapprove of at least some portion thereof, even if the default criteria remain unmodified. Nor does the invention require that the on-demand user interact with the intrusion detection system 30 for the purpose of specifying intrusion criteria. A non-technically savvy on-demand user may not wish to be bothered with such a task and may instead specify its security needs to personnel associated with the on-demand service provider, who will then edit the necessary files. Alternatively, the on-demand user may simply accept a default security policy that is made available by the on-demand security provider. For example, a service scenario could be implemented wherein the on-demand user is allowed to select one of several security packages offered by the on-demand service provider.

A further scenario falling within the scope of the invention would be where an authorized third party security provider (e.g., a security specialist) configures the on-demand user's security preferences by dealing with the on-demand service provider on behalf of the on-demand user, so that the on-demand user does not have to perform this function. This scenario is illustrated in FIG. 3 wherein reference numeral 8A represents a third party security provider system situated at a third party security provider premises 12A. The security provider could interact with the on-demand user and the on-demand service provider in several ways. According to one arrangement, the security provider would receive security criteria defined by the on-demand user, and then specify these criteria to the on-demand service provider on behalf of the on-demand user. In that case, the security criteria would be on-demand user-defined. According to an alternative arrangement the security provider would take a more active role by actually defining the security criteria and specifying these criteria to the on-demand service provider on behalf of the on-demand user. In that case, the security criteria would be security provider-defined. The on-demand user would be aware that security is being provided as a result of having contracted for some level of security protection offered by the security provider, but may not be aware of the security details and may not be considered to have defined the security criteria, this task having been left to the security provider. Under any of the third party security provider scenarios above, the security provider can be authorized by the on-demand user to receive all security notifications provided by the intrusion detection system 30 and respond accordingly. Alternatively, the security provider could forward all or part of such information to the on-demand user for response.

In the exemplary implementation of FIG. 3, the intrusion detection system 30 comprises an intrusion detection system (IDS) controller 32 that resides on one of the data processing hosts of the system 4 (e.g., host $6_3$). The intrusion detection system 30 further includes intrusion detection system (IDS) agents $34_1, 34_2, 34_3 \ldots 34_n$ respectively associated with each data processing host $6_1, 6_2, 6_3 \ldots 6_n$ of the system 4. The IDS agents $34_1, 34_2, 34_3 \ldots 34_n$ are responsible for monitoring user-defined events associated with user-defined resources. An event/resource definition file $36_1, 36_2, 36_3 \ldots 36_n$ is respectively maintained at each data processing host $6_1, 6_2, 6_3 \ldots 6_n$ to specify the monitoring operations performed by each IDS agent $34_1, 34_2, 34_3 \ldots 34_n$. Depending on the programming provided by (or on behalf of) the on-demand user, the event/resource definition files $36_1, 36_2, 36_3 \ldots 36_n$ can either be identical to each other, such that each IDS agent $34_1, 34_2, 34_3 \ldots 34_n$ tracks the same resources for the same set of intrusion events, or different event/resource definition files can be specified for each IDS agent. In the latter case, each event/resource definition file will individually program a respective IDS agent $34_1, 34_2, 34_3 \ldots 34_n$ to monitor agent-specific sets of user-defined intrusion events associated with agent-specific resources. The IDS agents $34_1, 34_2, 34_3 \ldots 34_n$ use the event/resource definition files $36_1, 36_2, 36_3 \ldots 36_n$ to monitor activities occurring on the data processing hosts $6_1, 6_2, 6_3 \ldots 6_n$. Activities that are not defined as intrusion events are ignored. Activities that are defined as intrusion events are identified and reported as intrusion activity by the IDS agents $34_1, 34_2, 34_3 \ldots 34_n$ to the IDS controller 32.

The IDS controller 32 is the main control center of the intrusion detection system 30. It is adapted to manage and monitor the IDS agents $34_1, 34_2, 34_3 \ldots 34_n$, interpret agent reports of intrusion event activity, and communicate intrusion-related information to the on-demand user system 8 (or other location authorized by the on-demand user). If configured to do so by (or on behalf of) the on-demand user, the IDS controller 32 will also instruct the IDS agents $34_1, 34_2, 34_3 \ldots 34_n$ to implement user-defined remedial actions in response to reported intrusion events. Alternatively, the IDS controller 32 could directly implement user-defined remedial actions without using the IDS agents $34_1, 34_2, 34_3 \ldots 34_n$. Moreover, as described in more detail below, the IDS agents $34_1, 34_2, 34_3 \ldots 34_n$ could implement user-defined remedial actions without involvement of the IDS controller 32.

With regard to the management and monitoring of the IDS agents $34_1, 34_2, 34_3 \ldots 34_n$, the IDS controller 32 is responsible for spawning each such software entity as each of the various data processing hosts $6_1, 6_2, 6_3 \ldots 6_n$ come online following system startup. The IDS controller 32 thereafter monitors agent operational status and takes corrective action (e.g., a restart sequence) in the event that an IDS agent $34_1, 34_2, 34_3 \ldots 34_n$, malfunctions or becomes non-responsive.

With regard to the receipt and interpretation of reports of intrusion activity provided by the IDS agents $34_1, 34_2, 34_3 \ldots 34_n$, the IDS controller 32 can be implemented to provide a service interface (e.g., a TCP/IP network port) that the IDS agents access to report intrusion events. As each intrusion report is received at the IDS controller 32, it can be processed according to event-action rules specified in a rule set file 38 maintained on the data processing host (e.g., $6_3$) that hosts the IDS controller 32. This rule set file 38 contains the event-action rules defined by (or on behalf of) the on-demand user, but as indicated above, a default rule set may be provided to establish a starting point for user customization. When a specific rule requires that a response action be taken following receipt of an intrusion event report, the IDS controller 32 will orchestrate that action following the lookup in the rule set file 38 (either alone or with assistance from the IDS agents $34_1, 34_2, 34_3 \ldots 34_n$). It will be appreciated that different event-action rules may be specified for each data processing host $6_1, 6_2, 6_3 \ldots 6_n$.

Although a single rule set file 38 is shown for use by the IDS controller 32 on the data processing host $6_3$, an alternative arrangement could be implemented wherein some or all of the event-action rules specified by (or on behalf of) the on-demand user are maintained in plural rule set files distributed across the data processing hosts $6_1, 6_2, 6_3 \ldots 6_n$ (see reference numerals $38_1, 38_2 \ldots 38_n$ in FIG. 3). Instead of performing centralized event-action rule set processing at the IDS controller 32, such processing would be performed in distributed fashion by the IDS agents $34_1, 34_2, 34_3 \ldots 34_n$ relative to their respective local intrusion events. The IDS agents $34_1, 34_2, 34_3 \ldots 34_n$ could then directly implement user-defined remedial actions and report such activities to the IDS controller 32.

With regard to response actions involving the communication of intrusion-related information to the on-demand user system 8 (or other location authorized by the on-demand user), the IDS controller 32 can be programmed to log all intrusion activity and periodically report the log information to the on-demand user (or other entity authorized by the on-demand user). The frequency of such reports is programmable by (or on behalf of) the on-demand user, and may be based on perceived threat level and other factors.

The intrusion detection system 30 may further comprise a standby IDS controller 40 that can run on the same data processing host (e.g., $6_3$) as the IDS controller 32, or on a different data processing host of the system 4. The standby IDS controller 40 is adapted to assume IDS controller functions in the event that the IDS controller 32 fails or is otherwise incapable of performing such functions. It will be appreciated that the combination of an IDS controller 32, one or more IDS agents $34_1, 34_2, 34_3 \ldots 34_n$ controlled by the IDS controller, and a standby IDS controller 40 provides an intrusion detection system 30 in which there is no single point of failure, and in which every data processing host $6_1, 6_2, 6_3 \ldots 6_n$ runs independent intrusion detection system services monitored by a highly available IDS controller pair.

Figure 4:
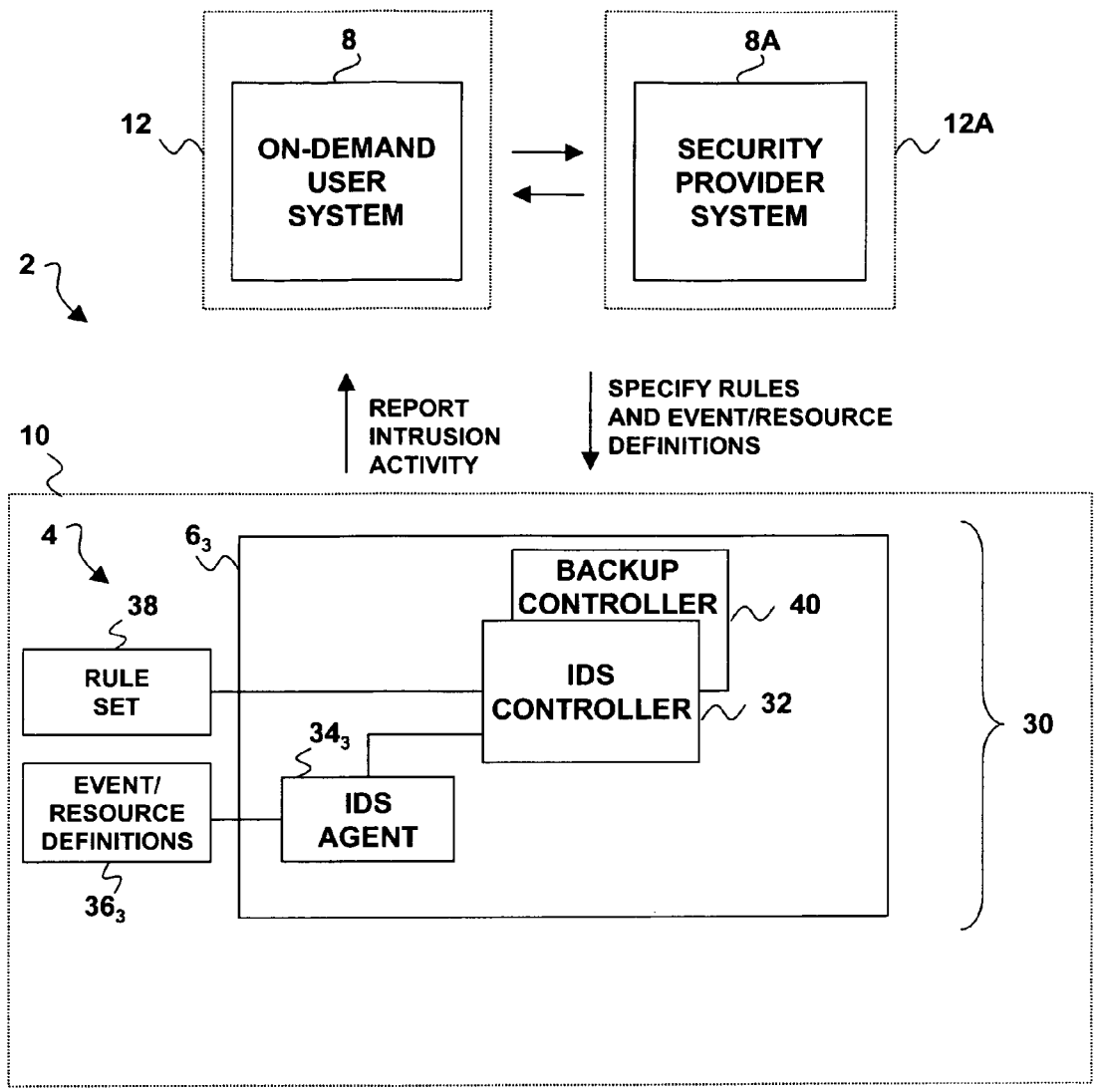
FIG. 4 is a detailed functional block diagram showing features of an intrusion detection system according to the invention running in an installation of the system illustrated in FIG. 1 in which there is a single data processing host.

It will be seen in FIG. 3 that the intrusion detection system 30 is a distributed software entity that spans plural data processing hosts $6_1, 6_2, 6_3 \ldots 6_n$. As shown in FIG. 4, the intrusion detection system 30 can also be used in an environment where a single data processing host (e.g., the host $6_3$) is the only node providing remote, on-demand service to the on-demand user system 8. In both the plural host (FIG. 3) and single host (FIG. 4) embodiments, the data processing host (e.g., the host $6_3$) runs both the IDS controller 32 and an IDS agent (e.g., the agent $34_3$).

Figure 5:
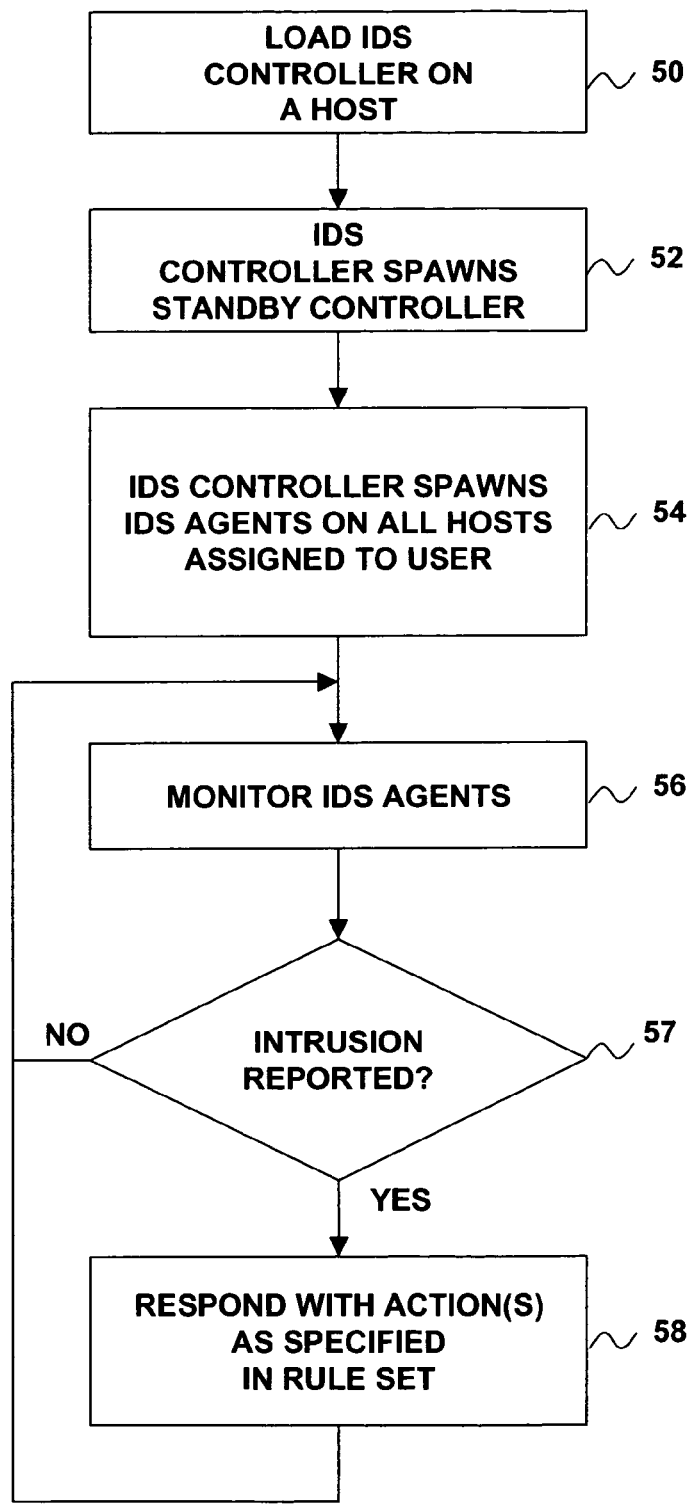
FIG. 5 is a flow diagram showing steps performed during initialization and operation of the intrusion detection system by an intrusion detection system controller running in the system of FIG. 1.

Turning now to FIG. 5, an exemplary logic flow that can be implemented by the IDS controller 32 during initialization and operation of the intrusion detection system 30 will be described. Beginning in step 50, the IDS controller 32 is loaded for execution on a node of the system 4, such as the data processing host $6_3$ in FIGS. 3 and 4. Depending on implementation specifics, the IDS controller 32 will run within a suitable software execution context on the data processing host $6_3$, which might be an operating system kernel process, a user process with elevated (e.g., root or administrative) privileges, or a combination of the foregoing. An image of the rule set 38 (if present) will also be created in memory.

In step 52, the IDS controller 32 spawns the standby controller 40. For security reasons, the standby controller 40 is spawned on the same node that runs the IDS controller 32 (e.g., the data processing host $6_3$). Alternatively, system robustness could be improved by hosting the standby controller 40 on a separate node. In that case, the standby controller 40 would remain operational even if the data processing host $6_3$ went down. However, the security level of the intrusion detection system 30 could be affected because the IDS controller 32 and the standby controller 40 would be required to communicate with each other using a network protocol (such as TCP/IP) instead of the interprocess communication that can be used when these entities run on the same node.

In step 54, the IDS controller 32 spawns one of the IDS agents $34_1$, $34_2$, $34_3$ ... $34_n$ on each node of the system 4 (e.g., data processing host $6_1$, $6_2$, $6_3$ ... $6_n$ in FIG. 3 or data processing host $6_3$ in FIG. 4). Depending on implementation specifics, the IDS agents $34_1$, $34_2$, $34_3$ ... $34_n$ will run within suitable software execution contexts at each host node. These might be operating system kernel processes, user processes with elevated (e.g., root or administrative) privileges, or a combination of the foregoing. Images of the event/resource files $36_1$, $36_2$, $36_3$ ... $36_n$ will also be respectively created in the memories of the respective data processing hosts $6_1$, $6_2$, $6_3$ ... $6_n$.

In step 56, the IDS controller 32 begins monitoring for intrusion events reported by the IDS agents $34_1$, $34_2$, $34_3$ ... $34_n$. When an intrusion report is received in step 57, the IDS controller 32 responds in step 58 by implementing actions specified in the rule set 38. As indicated, this will typically include the logging and reporting of intrusion events to the on-demand user system 8 (or other location authorized by the on-demand user), and may also include the implementation of user-defined remedial actions. As indicated above, such remedial actions could be implemented directly by the IDS controller 32, or by submitting action requests to the IDS agents $34_1$, $34_2$, $34_3$ ... $34_n$. On the other hand, if the IDS agents $34_1$, $34_2$, $34_3$ ... $34_n$ perform their own event-action processing using local rule sets ($38_1$, $38_2$ ... $38_n$ in FIG. 3), the IDS controller 32 will simply receive reports of intrusions and the actions taken by the agents. Again, this information will typically be logged by the IDS controller 32 and reported to the on-demand user (or other entity authorized by the on-demand user).

Figure 6:
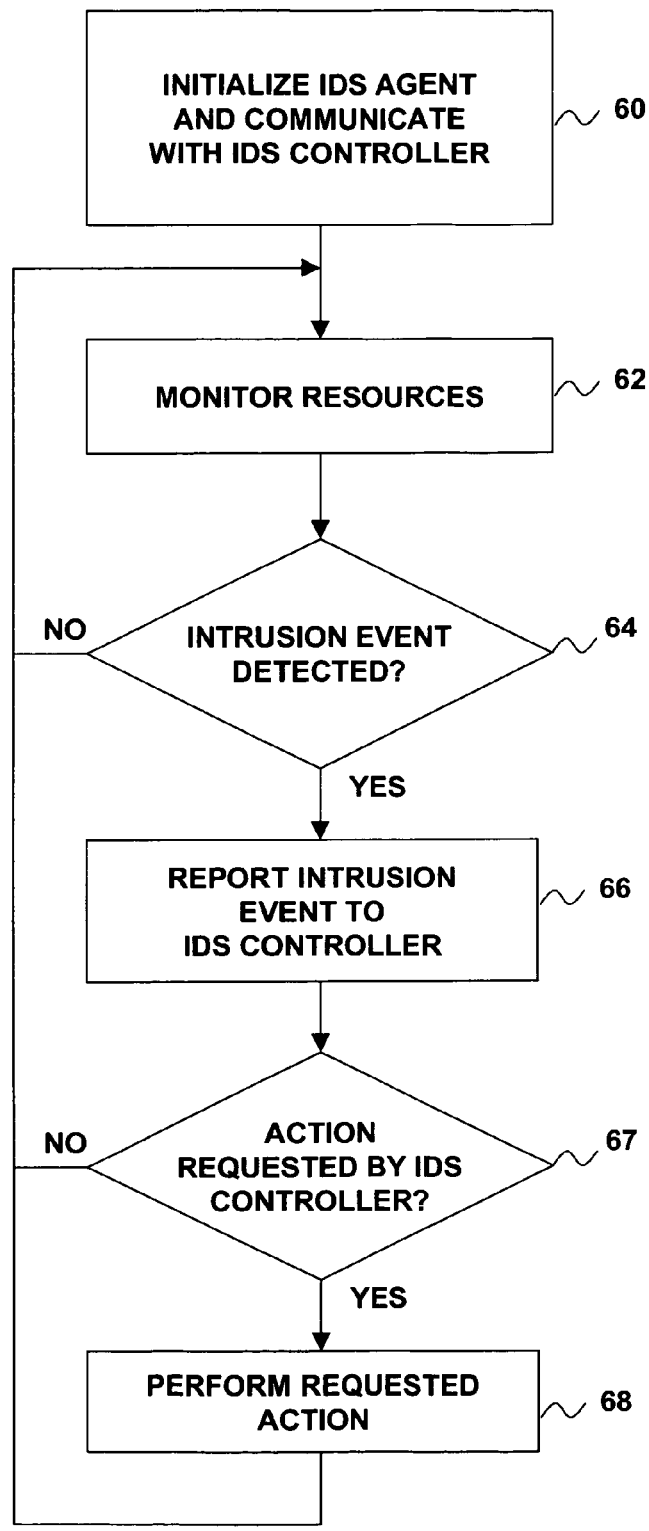
FIG. 6 is a flow diagram showing steps performed during operation of the intrusion detection system by an intrusion detection system agent running in the system of FIG. 1.

Turning now to FIG. 6, an exemplary logic flow that can be implemented by the IDS agents $34_1$, $34_2$, $34_3$ ... $34_n$ during initialization and operation of the intrusion detection system 30 will be described. Beginning in step 60, each IDS agent $34_1$, $34_2$, $34_3$ ... $34_n$ initializes itself and establishes communication with the IDS controller 32. In step 62, each IDS agent $34_1$, $34_2$, $34_3$ ... $34_n$ begins monitoring resources identified in the associated event/resource definition file $36_1$, $36_2$, $36_3$ ... $36_n$, for intrusion events as defined in the event/resource definition file. If an intrusion event is detected in step 64, the detecting IDS agent $34_1$, $34_2$, $34_3$ ... $34_n$ reports the intrusion event to the IDS controller 32 in step 66. If requested to do so by the IDS controller 32 in step 67, the detecting IDS agent $34_1$, $34_2$, $34_3$ ... $34_2$ will perform a user-defined remedial action in step 68. Resource monitoring then resumes. Alternatively, if the IDS agents $34_1$, $34_2$, $34_3$ ... $34_n$ perform their own event-action processing using local rule sets ($38_1$, $38_2$ ... $38_n$ in FIG. 3), the detecting IDS agent will perform the required action directly. It will typically also report the intrusion event and the action taken to the IDS controller 32.

Figure 7:
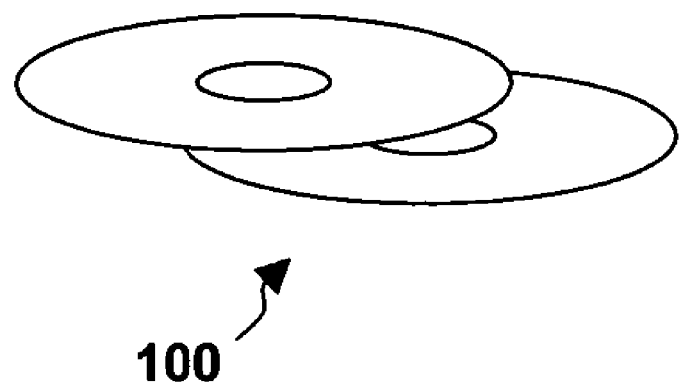
FIG. 7 is a diagrammatic illustration of storage media that can be used to store a computer program product for implementing intrusion detection functions in accordance with the invention.

Accordingly, an intrusion detection system for use in a remote, on-demand computing service environment has been disclosed. It will be appreciated that the inventive concepts may be variously embodied in any of a data processing system, a machine implemented method, and a computer program product in which programming means are recorded on media for controlling a computer system to perform the required functions. Exemplary data storage media for storing such programming means are shown by reference numeral 100 in FIG. 7. The media 100 are shown as being portable optical storage disks of the type that are conventionally used for commercial software sales. Such media can store the programming means of the invention, either alone or in conjunction with an operating system or other software product that incorporates the required functionality. The programming means could also be stored on portable magnetic media (such as floppy disks, flash memory sticks, etc.) or on magnetic media combined with drive systems (e.g. disk drives) incorporated in computer platforms.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for implementing an intrusion detection system in an on-demand computing service environment in which one or more data processing hosts are made available to a remote on-demand user that does not have physical custody and control over said host(s), comprising:

monitoring resources for intrusion events and implementing responses according to event-action rules;

said resources, said intrusion events and said event-action rules being defined by said on-demand user to a third-party entity authorized by said on-demand user to specify security criteria to an on-demand service provider implementing said on-demand computing service environment;

said monitoring being performed by one or more intrusion detection agents that are run by said one or more data processing hosts, each intrusion detection agent being associated with a single one of said data processing hosts, and each of said data processing hosts that is being monitored running at least one of said intrusion detection agents;

said user-defined resources including hardware resources, non-network system software resources, non-network, local login system access resources and network access resources;

said user-defined intrusion events including hardware events, non-network system software events, non-network, local login system access events and network access events; and said user-defined event-action rules including notifying said on-demand user of said user-defined intrusion events.

2. A method in accordance with claim 1 wherein said third party entity is a security provider authorized by said on-demand user to interact with said one or more data processing hosts.

3. A method for implementing an intrusion detection system in an on-demand computing service environment in which one or more data processing hosts is made available to a remote on-demand user that does not have physical custody and control over said host(s), comprising:

monitoring resources for intrusion events and implementing responses according to event-action rules;

said resources, said intrusion events and said event-action rules being defined by a third party entity authorized by said on-demand user to specify security criteria to an on-demand service provider implementing said on-demand computing service environment;

said monitoring being performed by one or more intrusion detection agents that are run by said one or more data processing hosts, each intrusion detection agent being associated with a single one of said data processing hosts, and each of said data processing hosts that is being monitored running at least one of said intrusion detection agents;

said user-defined resources including hardware resources, non-network system software resources, non-network, local login system access resources and network access resources;

said user-defined intrusion events including hardware events, non-network system software events, non-network, local login system access events and network access events; and said user-defined event-action rules including notifying said on-demand user of said user-defined intrusion events.

4. A method in accordance with claim 3 wherein said third party entity is a security provider authorized by said on-demand user to interact with said one or more data processing hosts.

* * * * *

UNITED STATES PATENT AND TRADEMARK OFFICE
CERTIFICATE OF CORRECTION

| | | |
|---|---|---|
| PATENT NO. | : 7,657,939 B2 | Page 1 of 1 |
| APPLICATION NO. | : 11/079380 | |
| DATED | : February 2, 2010 | |
| INVENTOR(S) | : Strauss et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 926 days.

Signed and Sealed this

Thirtieth Day of November, 2010

David J. Kappos
*Director of the United States Patent and Trademark Office*